United States Patent
Al Jassmi et al.

(10) Patent No.: US 10,399,247 B1
(45) Date of Patent: Sep. 3, 2019

(54) COMPOUND NOZZLE FOR CEMENT 3D PRINTER TO PRODUCE THERMALLY INSULATED COMPOSITE CEMENT

(71) Applicant: UNITED ARAB EMIRATES UNIVERSITY, Al Ain (AE)

(72) Inventors: Hamad Al Jassmi, Al Ain (AE); Fady S. Alnajjar, Al Ain (AE); Waleed K. Ahmed, Al Ain (AE)

(73) Assignee: Qatar University, Doha (QA)

( * ) Notice: Subject to any disclaimer, the term of this patent is extended or adjusted under 35 U.S.C. 154(b) by 0 days.

(21) Appl. No.: 16/234,357

(22) Filed: Dec. 27, 2018

(51) Int. Cl.
| | |
|---|---|
| B28B 1/00 | (2006.01) |
| B28B 3/26 | (2006.01) |
| E04B 1/16 | (2006.01) |
| B33Y 30/00 | (2015.01) |

(52) U.S. Cl.
CPC ............ B28B 1/001 (2013.01); B28B 3/2636 (2013.01); B33Y 30/00 (2014.12); E04B 1/16 (2013.01); E04B 2103/02 (2013.01)

(58) Field of Classification Search
CPC ....... B28B 1/001; B28B 3/2636; B33Y 30/00; E04B 1/16; E04B 2103/02; B28C 5/00; B28C 5/026; B28C 5/04; B28C 5/38; B28C 5/408; B28C 7/126; B28C 7/128
See application file for complete search history.

(56) References Cited

U.S. PATENT DOCUMENTS

| 1,124,579 A | * | 1/1915 | Ambursen | .............. B28C 5/026 239/403 |
| 1,459,657 A | * | 6/1923 | Dempsey | .................. B28C 5/38 366/40 |
| 1,648,216 A | * | 11/1927 | Cassiere | ................. B28C 5/026 239/428 |

(Continued)

FOREIGN PATENT DOCUMENTS

| CN | 204818064 U | 12/2015 |
| CN | 106965428 A | 7/2017 |

(Continued)

OTHER PUBLICATIONS

Anne Van Der Meij, Co-extrusion 3D printing improves solar cells and battery, Mar. 14, 2013, https://www.3ders.org/articles/20130314-co-extrusion-3d-printing-improves-solar-cells-and-battery.html.

*Primary Examiner* — Benjamin R Shaw
(74) *Attorney, Agent, or Firm* — Richard C. Litman

(57) ABSTRACT

The compound nozzle for a cement 3D printer to produce thermally insulated composite cement is useful for producing composite thermally insulated cement sections using a 3D printer. The nozzle includes an insulation nozzle concentrically disposed in the central discharge orifice of the compound nozzle to produce a stream of insulation media axially surrounded by a stream of cement mixture extruded from the nozzle to form a wall with a cement exterior and an insulation interior. A motor-driven auger is controlled by a controller, and the cement is supplied from the top either manually or by a concrete pump. The insulating material is (Continued)

supplied to the insulation nozzle by a separate line that uses another pump. The system includes a cleaning mechanism to clean the internal components of the compound nozzle using water jets and a drying system to dry the internal components without disassembling the system.

5 Claims, 3 Drawing Sheets

(56) References Cited

U.S. PATENT DOCUMENTS

| | | | | |
|---|---|---|---|---|
| 1,770,011 | A * | 7/1930 | Poston | B28C 5/026 239/336 |
| 2,597,916 | A * | 5/1952 | Anderson | B28C 5/026 366/10 |
| 3,035,940 | A * | 5/1962 | Hobson | E04F 21/12 106/650 |
| 3,185,396 | A * | 5/1965 | Black | E04F 21/12 239/336 |
| 3,669,418 | A * | 6/1972 | Cornwell | B28C 5/003 366/5 |
| 4,042,175 | A * | 8/1977 | Johnson | B05B 7/1495 239/420 |
| 4,095,748 | A * | 6/1978 | Ohtake | B01F 5/0256 239/419.3 |
| 4,263,346 | A * | 4/1981 | Sandell | B05B 7/1495 118/308 |
| 4,411,389 | A * | 10/1983 | Harrison | B05B 7/149 222/145.1 |
| 4,530,468 | A * | 7/1985 | Sperber | B05B 7/0025 239/419.3 |
| 4,796,814 | A * | 1/1989 | Klemm | B05B 7/1481 239/430 |
| 5,389,167 | A * | 2/1995 | Sperber | B05B 7/0025 156/291 |
| 5,529,471 | A * | 6/1996 | Khoshevis | B28B 3/20 425/112 |
| 5,681,194 | A * | 10/1997 | Baker | B29B 17/00 428/903.3 |
| 5,718,508 | A * | 2/1998 | Williams | B01F 7/00433 366/138 |
| 6,004,626 | A * | 12/1999 | Noone | B05B 7/1481 427/427 |
| 6,095,082 | A * | 8/2000 | Belt | B05C 19/04 118/308 |
| 6,481,883 | B1 * | 11/2002 | Ellen | B28C 5/04 366/18 |
| 9,156,205 | B2 * | 10/2015 | Mark | B29C 70/20 |
| 2009/0039104 | A1 * | 2/2009 | Genewick | A23G 9/282 222/1 |
| 2013/0037628 | A1 * | 2/2013 | Wurz | B05B 7/0012 239/418 |
| 2014/0252668 | A1 * | 9/2014 | Austin | B28B 3/20 264/40.7 |
| 2014/0271961 | A1 * | 9/2014 | Khoshnevis | C04B 35/622 425/78 |
| 2016/0375451 | A1 * | 12/2016 | Hoiland | B05B 7/1486 239/398 |
| 2017/0365365 | A1 * | 12/2017 | White | G21F 1/042 |
| 2018/0071949 | A1 * | 3/2018 | Giles | B33Y 10/00 |
| 2018/0154437 | A1 * | 6/2018 | Mark | B22F 3/1025 |
| 2018/0169956 | A1 * | 6/2018 | Singov | B29C 64/40 |

FOREIGN PATENT DOCUMENTS

| | | |
|---|---|---|
| CN | 206416289 U | 8/2017 |
| CN | 107327045 A | 11/2017 |
| CN | 206967983 U | 2/2018 |
| KR | 20180012432 A | 2/2018 |

* cited by examiner

COMPOUND NOZZLE FOR CEMENT 3D PRINTER TO PRODUCE THERMALLY INSULATED COMPOSITE CEMENT

BACKGROUND

1. Field

The disclosure of the present patent application relates to building construction tools and methods, and particularly to a compound nozzle for a cement 3D printer to produce thermally insulated composite cement.

2. Description of the Related Art

A relatively new method of building construction involves the use of three-dimensional (3D) printers for printing cement. Walls are formed by printing the cement one layer at a time until a wall of the desired height is formed. The 3D printer includes a nozzle that is attached to a scanning mechanism that is controlled by a programmable controller, such as a computer. The scanning mechanism moves the nozzle in the X, Y and Z directions to form the wall. While the existing 3D printers provide flexibility in terms of the shape of the wall, when insulation is desired it must be added manually to the inside surface of the wall, the outside surface of the wall, or both after the cement wall is constructed. The current technique of insulating the cement wall is both time-consuming and expensive, requiring additional equipment and personnel. Thus, a compound nozzle for a cement 3D printer to produce thermally insulated composite cement solving the aforementioned problems is desired.

SUMMARY

The compound nozzle for a cement 3D printer to produce thermally insulated composite cement is useful for producing composite thermally insulated cement sections using a 3D printer. The nozzle is capable of printing self-insulated walls through the nozzle, thereby eliminating the extra work required to add insulation to an existing wall while increasing the insulation efficiency of the wall. The nozzle includes an insulation nozzle centered at the discharge opening of the cement nozzle. A motor-driven auger is controlled by a controller, and the cement is supplied from the top, either manually or by a concrete pump. The insulating material is supplied to the insulation nozzle by a separate line that uses another pump. The system also includes a cleaning mechanism to clean the internal parts of the compound nozzle through water jets that are provided at the top of the system and supplied water by a pump. A drying system is included to dry out the internal components without the need to disassemble the system when a job is completed.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
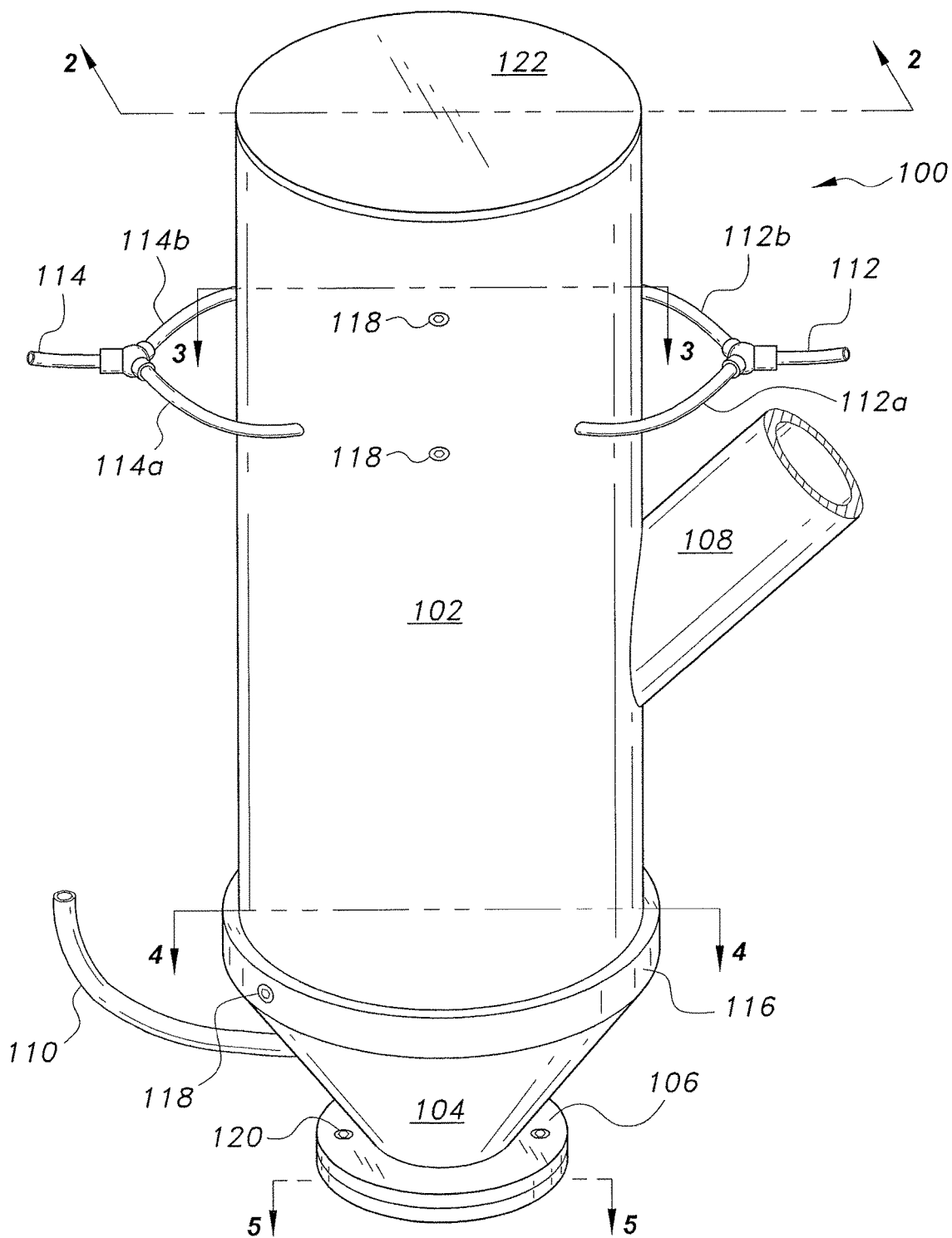
FIG. 1 is a perspective view of a compound nozzle for a cement 3D printer to produce thermally insulated composite cement.

FIG. 1 is a perspective view of a compound nozzle for a cement 3D printer to produce thermally insulated composite cement, the nozzle being designated generally as 100 in the drawings. Nozzle 100 includes a substantially cylindrical body 102 having a substantially conical discharge nozzle 104 at its lower end. The bottom of the discharge nozzle 104 includes a nozzle flange 106 for connecting the compound nozzle 100 to the printer head of a 3D printer using, for example, countersunk hex screws 120. The discharge nozzle 104 also includes an upper cylindrical portion 116 for attaching the discharge nozzle 104 to the cylindrical body 102 using three countersunk hex screws 118 (one shown in FIG. 1). A cement supply line 108 is attached obliquely to the body 102 for supplying cement to the interior of the body 102. An insulation supply line 110 supplies insulation media to the discharge nozzle 104. A water supply line 112 supplies water near the top of the body 102 for washing the internal components of the compound nozzle 100 between fabricating jobs, or intermittently, as needed. The water supply line 112 splits into two water supply arms 112a and 112b for supplying two water nozzles, as described below with respect to FIG. 2. Likewise, an air supply line 114 supplies pressurized air near the top of the body 102 for drying the internal components of the compound nozzle 100 after washing the internal components of the compound nozzle 100. The air supply line 114 splits into two air supply branches 114a and 114b for supplying two air drying nozzles, as described below with respect to FIG. 2. The top of the cylindrical body 102 may be closed with an appropriate cover 122 to protect internal components.

Figure 2:
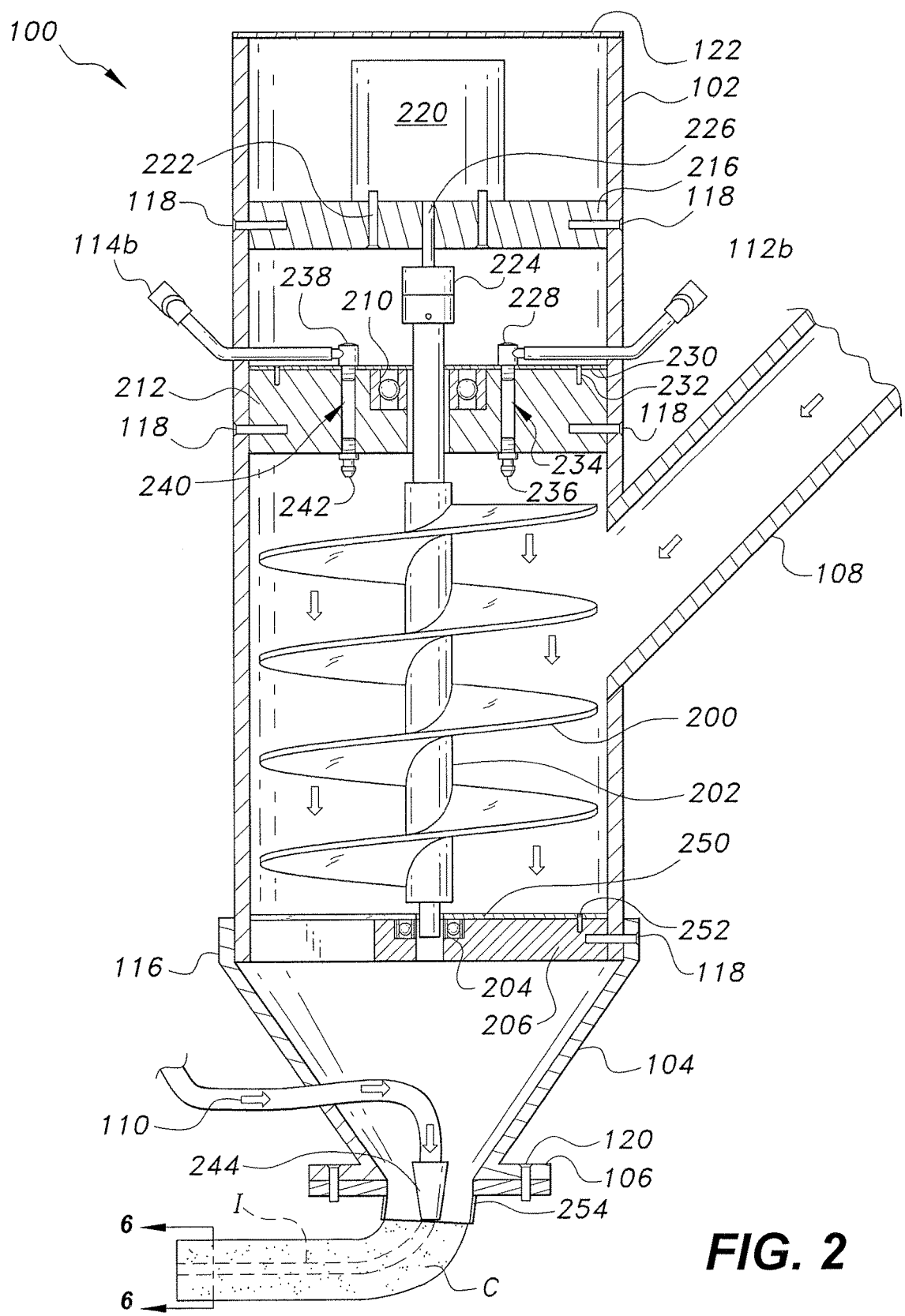
FIG. 2 is a section view taken through lines 2-2 of FIG. 1.

FIG. 2 is a cross sectional view of the compound nozzle 100, showing the internal components thereof. An auger 200 with a central driveshaft 202 is housed in the lower part of body 102. The auger 200 may have any suitable number of blades for preparing the cement mixture for discharge and extruding the cement mixture through the discharge orifice, as described below. The driveshaft 202 is rotatably supported on its lower end by a lower auger ball bearing 204 that is mounted in a lower auger ball bearing housing 206. The lower auger ball bearing housing 206 is held in place by three countersunk hex screws 118 that extend through through-holes in the upper cylindrical portion 116 of the discharge nozzle 104, through through-holes in the wall of the body 102 and into threaded holes in the lower auger ball bearing housing 206. A lower auger ball bearing housing reinforcing plate 250 is attached to the top of the lower auger ball bearing housing 206 using three countersunk hex screws 252.

The driveshaft 202 is rotatably supported at its upper end by an upper auger ball bearing 210 that is mounted in an upper auger ball bearing housing 212. The upper auger ball bearing housing 212 is held in place by four countersunk hex screws 118 (two shown in FIG. 2 and one shown in FIG. 1) that extend through through-holes in the wall of the body 102 and into threaded holes in the upper auger ball bearing housing 212. A motor support plate 216 is mounted above the upper auger ball bearing housing 212 using four countersunk screws 118 (two shown in FIG. 2 and one shown in FIG. 1) that extend through holes in the wall of the body 102 and into threaded holes in the motor support plate 216. A DC motor 220 is supported on the motor support plate 216 and is held in place by four countersunk hex screws 222 (two shown) that extend through holes in the motor support plate 216 and into threaded holes in the lower housing of the motor 220. A flexible coupling 224 connects the drive shaft 226 of the motor 220 with the central driveshaft 202 of the auger 200.

The upper auger ball bearing housing 212 also secures the washing and drying components. The water supply line 112b connects to a water elbow 228 that is held aligned with a bore 234 by an elbow retaining plate 230 that is attached to the upper auger ball bearing housing 212 using four countersunk hex screws 232 (two shown in FIG. 2). A water cleaning nozzle 236 is mounted in the upper auger ball bearing housing 212 and is aligned with the bore 234 on the bottom of the upper auger ball bearing housing 212 for directing water at the auger 200 and the other internal components of the compound nozzle 100. The air supply line 114b connects to an air elbow 238 that is also held aligned with a bore 240 by the elbow retaining plate 230. An air drying nozzle 242 is mounted in the upper auger ball bearing housing 212 and is aligned with the bore 240 on the bottom of the upper auger ball bearing housing 212 for directing air at the auger 200 and the other internal components of the compound nozzle 100.

The bottom of the discharge nozzle 104 includes a centrally located final discharge orifice 254 for discharging cement and insulation. The insulation supply line 110 terminates in an insulation discharge nozzle 244 positioned in the center of the final discharge orifice 254 for discharge of a separate stream of insulation media in the center of the stream of cement being discharged, as is further described below with respect to FIG. 5.

Figure 3:
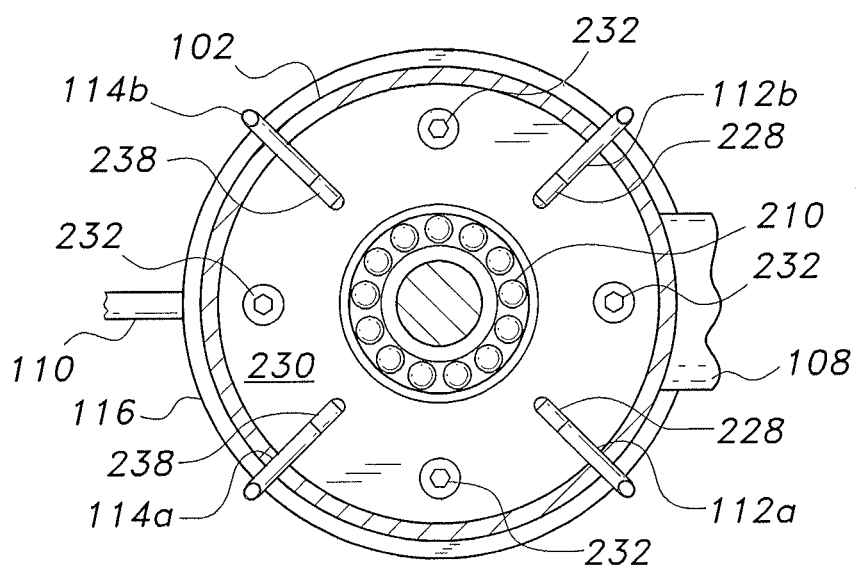
FIG. 3 is a section view taken through lines 3-3 of FIG. 1.

FIG. 3 is a section view of the compound nozzle 100 taken through lines 3-3 of FIG. 1 and shows the top of the upper auger ball bearing housing 212 surrounded by the body 102 and hidden by the elbow retaining plate 230. Both water supply lines 112a and 112b, as well as both air supply lines 114a and 114b, can be seen and are arranged radially at 90° to one another. The four countersunk screws 232 for holding the elbow retaining plate 230 on the upper auger ball bearing housing 212 are also shown and are also arranged radially at 90° to one another.

Figure 4:
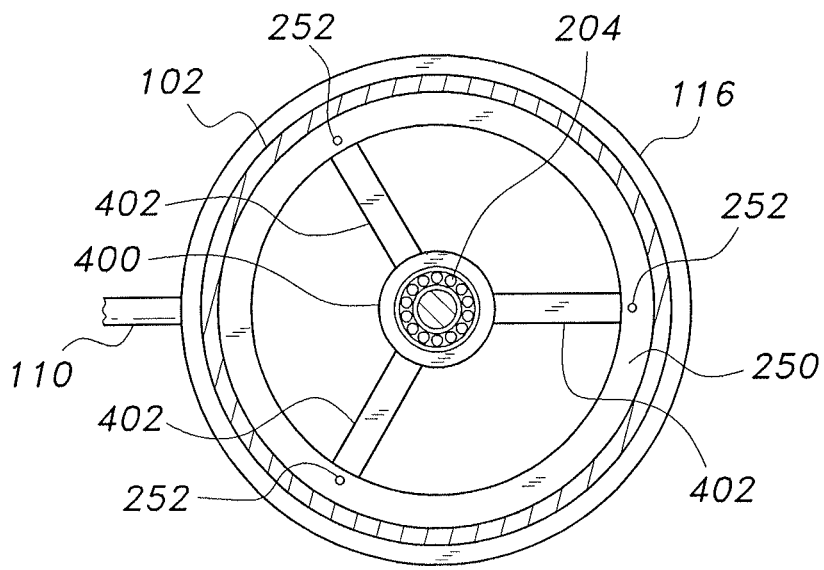
FIG. 4 is a section view taken through lines 4-4 of FIG. 1.

FIG. 4 is a section view of the compound nozzle 100 taken through lines 4-4 of FIG. 1 and shows the top of the lower auger ball bearing housing 212. The lower auger ball bearing housing 212 includes a central boss 400, the lower auger ball bearing race 204 being mounted in the central boss 400. Three supporting ribs 402 connect the central boss 400 to the body 102 using three countersunk hex screws 118 (one shown in FIG. 1 and one shown in FIG. 2). The lower auger ball bearing housing reinforcing plate 250 and the three countersunk hex screws 252 can also be seen in FIG. 4.

Figure 5:
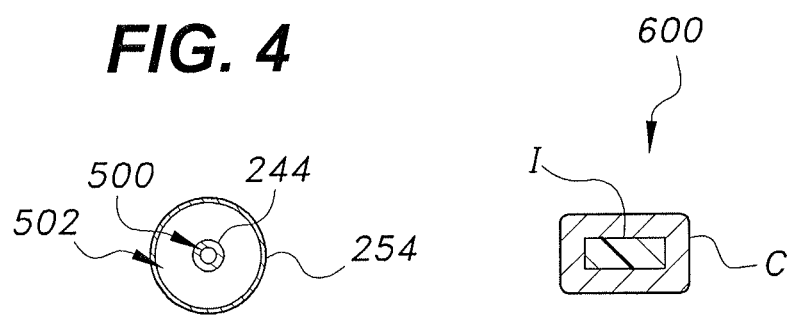
FIG. 5 is a section view taken through lines 5-5 of FIG. 1.

FIG. 5 shows the details of the final discharge orifice 254. The final discharge orifice 254 includes the insulation discharge nozzle 244 with a central opening 500 for discharging insulation media supplied via the insulation supply line 110. The insulation supply line 110 is connected to a pump, which pumps the insulation media through the supply line 110 and impels the insulation media through the insulation discharge nozzle 244 in a stream of insulation concentrically flowing within the stream of cement extruded through the discharge orifice 254. The cement is discharged in area 502 around the insulation discharge nozzle 244 to thereby produce a composite output including the insulation stream completely surrounded by a stream of cement. It should be noted that while only a single insulation discharge nozzle 244 is shown, multiple insulation discharge nozzles may be provided to produce multi-core insulation composite outputs.

Figure 6:
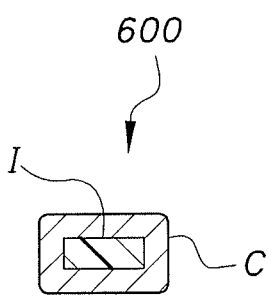
FIG. 6 is a section view taken through lines 6-6 of FIG. 2.

FIG. 6 is a section view of the composite output 600 of the compound nozzle 100. As can be seen, the insulation I is completely surrounded by the cement C. As the output 600 is discharged from the compound 3D printer cement/insulation nozzle 100, both the cement C and the insulation I settle to produce the structure shown having an increase in width and a decrease in height. To produce a wall, the compound nozzle 100 is used to deposit (print) multiple layers of the output section 600 on top of one another until the desired height of the wall is reached. This results in a composite cement/insulation wall that is substantially more insulated than a conventional all-cement wall, thereby eliminating the need for external insulation structures.

It is to be understood that the compound nozzle for a cement 3D printer to produce thermally insulated composite cement is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A compound nozzle for a cement 3D printer to produce thermally insulated composite cement, the nozzle comprising:
    a substantially cylindrical body having a top portion and a bottom portion;
    a cement supply line attached obliquely to the bottom portion of the cylindrical body for introducing a cement mixture into the cylindrical body;
    a substantially conical discharge nozzle having a conical peripheral outer surface, a top portion and a bottom portion, the top portion of the discharge nozzle being attached to the bottom portion of the substantially cylindrical body and adapted to receive the cement mixture, the bottom portion of the discharge nozzle defining a central discharge orifice for discharging a stream of cement from the cylindrical body; and
    at least one insulation supply line entering the conical discharge nozzle through the conical peripheral outer surface thereof, an insulation discharge nozzle disposed at the end of the insulation supply line, wherein the insulation discharge nozzle is concentrically disposed solely in the discharge orifice for discharging a stream of insulation media axially centered in the stream of cement, thereby producing a thermally insulated composite cement.

2. The compound nozzle as recited in claim 1, further comprising an auger mounted inside the substantially cylindrical body for preparing the cement mixture for discharge and extruding the cement mixture through the central discharge orifice.

3. The compound nozzle as recited in claim 1, further comprising:
    at least one water supply line entering the top portion of said cylindrical body; and at least one water cleaning nozzle attached to the at least one water supply line, the least one water cleaning nozzle being mounted in the top portion of said cylindrical housing.

4. The compound nozzle as recited in claim 1, further comprising:
   at least one air supply line entering the top portion of said cylindrical body; and
   at least one air drying nozzle attached to the at least one air supply line, the least one air drying nozzle being mounted in the top portion of said cylindrical housing.

5. The compound nozzle as recited in claim 1, further comprising a mounting flange extending from said discharge nozzle adapted for mounting the compound nozzle to a cement 3D printer.

* * * * *